United States Patent
Hokazono et al.

(10) Patent No.: US 9,741,213 B2
(45) Date of Patent: Aug. 22, 2017

(54) RADIO COMMUNICATION APPARATUS AND RADIO COMMUNICATION SYSTEM

(71) Applicant: Panasonic Intellectual Property Management Co., Ltd., Osaka (JP)

(72) Inventors: Shinya Hokazono, Fukuoka (JP); Takashi Watanabe, Fukuoka (JP); Katsumi Nakagawa, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 93 days.

(21) Appl. No.: 14/053,484

(22) Filed: Oct. 14, 2013

(65) Prior Publication Data

US 2014/0104038 A1    Apr. 17, 2014

(30) Foreign Application Priority Data

Oct. 16, 2012  (JP) .................... 2012-228863

(51) Int. Cl.
  *G08B 5/22*   (2006.01)
  *G08B 21/24*  (2006.01)
  *H04W 4/00*   (2009.01)
  *H04W 4/02*   (2009.01)

(52) U.S. Cl.
  CPC ............. *G08B 5/224* (2013.01); *G08B 21/24* (2013.01); *H04W 4/008* (2013.01); *H04W 4/02* (2013.01)

(58) Field of Classification Search
  CPC ...... G08B 3/1083; G08B 5/224; G08B 21/24; H04W 4/02; H04W 4/008
  USPC ............ 340/8.1; 370/338, 345; 455/467–469
  See application file for complete search history.

(56) References Cited

U.S. PATENT DOCUMENTS

| | | | | |
|---|---|---|---|---|
| 4,602,366 A | * | 7/1986 | Takumi | .................. 370/425 |
| 4,937,818 A | * | 6/1990 | Sonetaka | ................ 370/348 |
| 5,689,238 A | | 11/1997 | Cannon, Jr. et al. | |
| 5,929,779 A | | 7/1999 | MacLellan et al. | |
| 5,930,706 A | * | 7/1999 | Raith | ............. H04W 68/00 |
| | | | | 340/7.35 |

(Continued)

FOREIGN PATENT DOCUMENTS

| | | |
|---|---|---|
| JP | 1045221 A | 2/1998 |
| JP | 2002057789 A | 2/2002 |

(Continued)

OTHER PUBLICATIONS

Extended European Search Report, dated Feb. 5, 2014, for corresponding European Patent Application No. 13188386.0-1856, 6 pages.

*Primary Examiner* — Hai Phan
*Assistant Examiner* — Royit Yu
(74) *Attorney, Agent, or Firm* — Seed IP Law Group LLP

(57) ABSTRACT

Disclosed is a radio communication apparatus capable of stopping useless transmission of a calling signal to a locator. A calling apparatus transmits, using a near field radio communication apparatus, a calling signal to a locator attached to an item and outputting a notification sound, the calling signal being used for calling the locator. The calling apparatus periodically stands by for reception of a response signal from the locator using one slot when performing consecutive transmission of the calling signal to the locator using a plurality of slots. The calling apparatus stops the consecutive transmission of the calling signal by being triggered upon reception of the response signal from the locator.

12 Claims, 13 Drawing Sheets

(56) References Cited

U.S. PATENT DOCUMENTS

| | | | |
|---|---|---|---|
| 6,523,148 B1* | 2/2003 | Junghans | 714/797 |
| 6,556,586 B1* | 4/2003 | Sipila | 370/469 |
| 6,577,239 B2 | 6/2003 | Jespersen | |
| 6,778,670 B1* | 8/2004 | Sharma et al. | 380/262 |
| 7,512,236 B1* | 3/2009 | Zhu | 380/255 |
| 2001/0052846 A1 | 12/2001 | Jespersen | |
| 2002/0034194 A1* | 3/2002 | Young et al. | 370/498 |
| 2002/0163899 A1* | 11/2002 | Liu | 370/337 |
| 2002/0169539 A1* | 11/2002 | Menard et al. | 701/200 |
| 2003/0099221 A1* | 5/2003 | Rhee | 370/338 |
| 2006/0215593 A1* | 9/2006 | Wang et al. | 370/315 |
| 2008/0203159 A1 | 8/2008 | Luetzelberger | |
| 2009/0109959 A1* | 4/2009 | Elliott et al. | 370/352 |
| 2009/0185505 A1* | 7/2009 | Ripstein | G06K 7/0008 370/254 |
| 2009/0257420 A1* | 10/2009 | Kore et al. | 370/345 |
| 2009/0303968 A1* | 12/2009 | Jou | H04L 1/0025 370/336 |
| 2009/0305637 A1* | 12/2009 | Jang et al. | 455/63.1 |
| 2011/0012775 A1* | 1/2011 | Richards | H01Q 1/38 342/146 |
| 2011/0018712 A1 | 1/2011 | Luetzelberger | |
| 2011/0291803 A1* | 12/2011 | Bajic | G08B 13/2462 340/10.1 |
| 2013/0189924 A1* | 7/2013 | Pedro et al. | 455/41.1 |

FOREIGN PATENT DOCUMENTS

| | | |
|---|---|---|
| JP | 2002536898 A | 10/2002 |
| JP | 2008503826 A | 2/2008 |
| JP | 2008070964 A | 3/2008 |
| JP | 2012010277 A | 1/2012 |
| JP | 2014-77699 A | 5/2014 |
| JP | 2014-78908 A | 5/2014 |
| WO | 0046774 A1 | 8/2000 |
| WO | 01/37004 A1 | 5/2001 |
| WO | 2014/057624 A1 | 4/2014 |
| WO | 2014/057630 A1 | 4/2014 |

* cited by examiner

RADIO COMMUNICATION APPARATUS AND RADIO COMMUNICATION SYSTEM

CROSS REFERENCE TO RELATED APPLICATIONS

This application is entitled to the benefit of Japanese Patent Application No. 2012-228863 filed on Oct. 16, 2012, the disclosure of which including the specification, drawings and abstract is incorporated herein by reference in its entirety.

TECHNICAL FIELD

The present invention relates to a radio communication apparatus and a radio communication system that are used for detecting an item.

BACKGROUND ART

Locator systems are known as radio communication systems used for detecting items (referred to also as "target objects" such as a key, a wallet, a mobile device, and a pet) (for example, Patent Literature 1). A locator system is equipped with a locator attached to an item and a calling apparatus carried around by a user. The locator and the calling apparatus can communicate with each other through near field radio communication. When a user wants to find the item, a user operates the calling apparatus. Upon reception of a radio signal (calling signal) transmitted by an operation of the user, the locator generates a notification sound. With this sound, the user can know that the item is in the direction in which the notification sound is generated.

CITATION LIST

Patent Literature

PTL 1
Japanese Unexamined Patent Application Publication (Translation of PCT Application) No. 2008-503826

SUMMARY OF INVENTION

Technical Problem

However, the above-described locator system has a problem in that the calling apparatus continues to transmit a calling signal until a certain time period elapses although the calling signal has been received by the locator without any problems. When the transmission of a calling signal is uselessly continued in this manner, the communication of other apparatuses may be interrupted, or the reception of a response signal transmitted from the locator is may be delayed in the calling apparatus.

An object of the present invention is to provide a radio communication apparatus and a radio communication system capable of stopping useless transmission of a calling signal from a calling apparatus to a locator.

Solution to Problem

According to an aspect of the present invention, for the purpose of achieving the abovementioned object, there is provided a radio communication apparatus including: a transmission section that transmits, using a near field radio communication protocol, a calling signal to a locator attached to an item, the calling signal being used for calling the locator; and a control section that regularly stands by for reception of a response signal from the locator during consecutive transmission of the calling signal and stops the consecutive transmission of the calling signal by being triggered upon reception of the response signal.

Advantageous Effects of Invention

According to the present invention, useless transmission of a calling signal from a calling apparatus to a locator can be stopped.

DESCRIPTION OF EMBODIMENTS

Hereinafter, embodiments of the present invention will be described.

Figure 1:
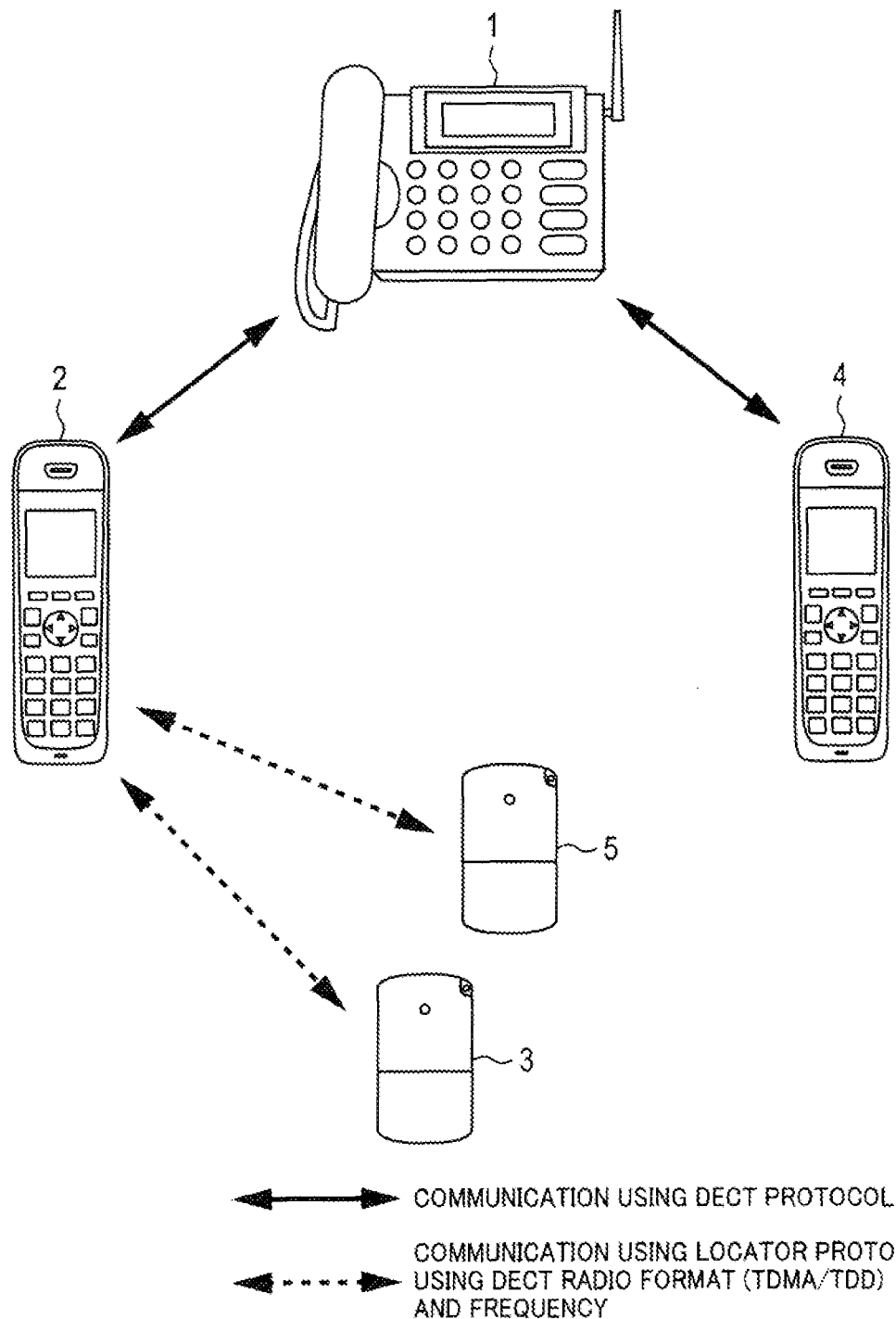
FIG. 1 is a system configuration diagram of a radio communication system according to an embodiment of the present invention.

First, an example of the configuration of a locator system (radio communication system) according to an embodiment of the present invention will be described. FIG. 1 is a diagram that illustrates an example of a locator system according to this embodiment.

As illustrated in FIG. 1, the locator system is equipped with base unit 1, calling apparatus 2, and locator 3. Base unit 1 serves as a reference for synchronization between base unit 1 and calling apparatus 2. Calling apparatuses 2 and 4 are slave apparatuses that follow the synchronization reference of base unit 1. Locators 3 and 5 are slave apparatuses that follow the synchronization reference of calling apparatus 2. Calling apparatus 2 is a mobile communication terminal such as a radio handset of a cordless phone or a personal digital assistant (PDA).

Figure 2:
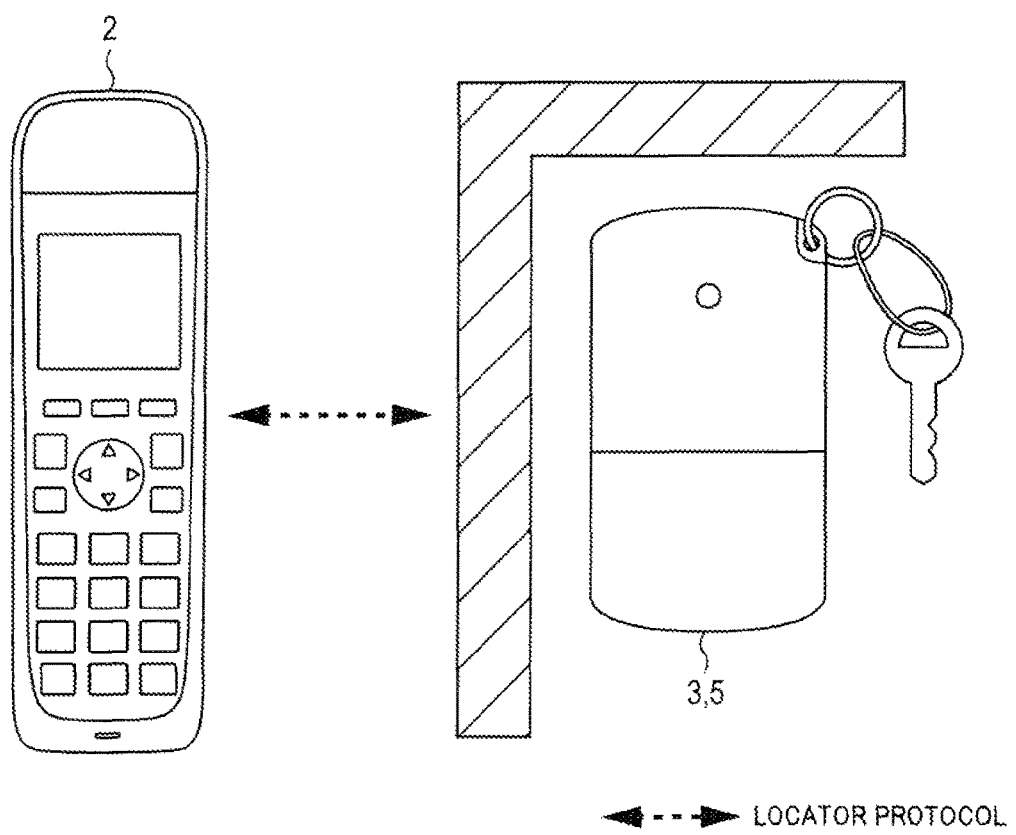
FIG. 2 is an explanatory diagram that illustrates how a calling apparatus calls a locator in a radio communication system according to an embodiment of the present invention.

FIG. 2 illustrates how calling apparatus 2 calls locator 3. Calling apparatus 2 is operable as a terminal for a user to perform an operation of calling locator 3. Here, the term "calling" means requesting locator 3 to transmit a signal or outputting a notification signal to locator 3, for example. A signal that is transmitted to locator 3 for "calling" described above is a "calling signal." Here, calling apparatus 2 may be a terminal that serves as a handset of the cordless phone system. Locator 3 is a terminal that is attached to an item desired to be detected by a user. As illustrated in FIG. 2, locator 3, for example, is built in a tag or holder attachable to a key, for example. Locator 3 transmits a response signal for a calling signal transmitted from calling apparatus 2.

Calling apparatus 2 and locator 3 are examples of radio communication apparatuses according to this embodiment and perform near field radio communication using a locator protocol. Through such radio communication, a calling signal and a response signal are exchanged. In this specification, "radio communication" includes radio transmission and radio reception. The locator protocol is a communication protocol of which the radio format and frequency are compliant with a time division multiple access (TDMA)/time division duplex (TDD) standard. As an example of such a protocol, there is a digital enhanced cordless telecommunications (DECT) protocol.

Figure 3:
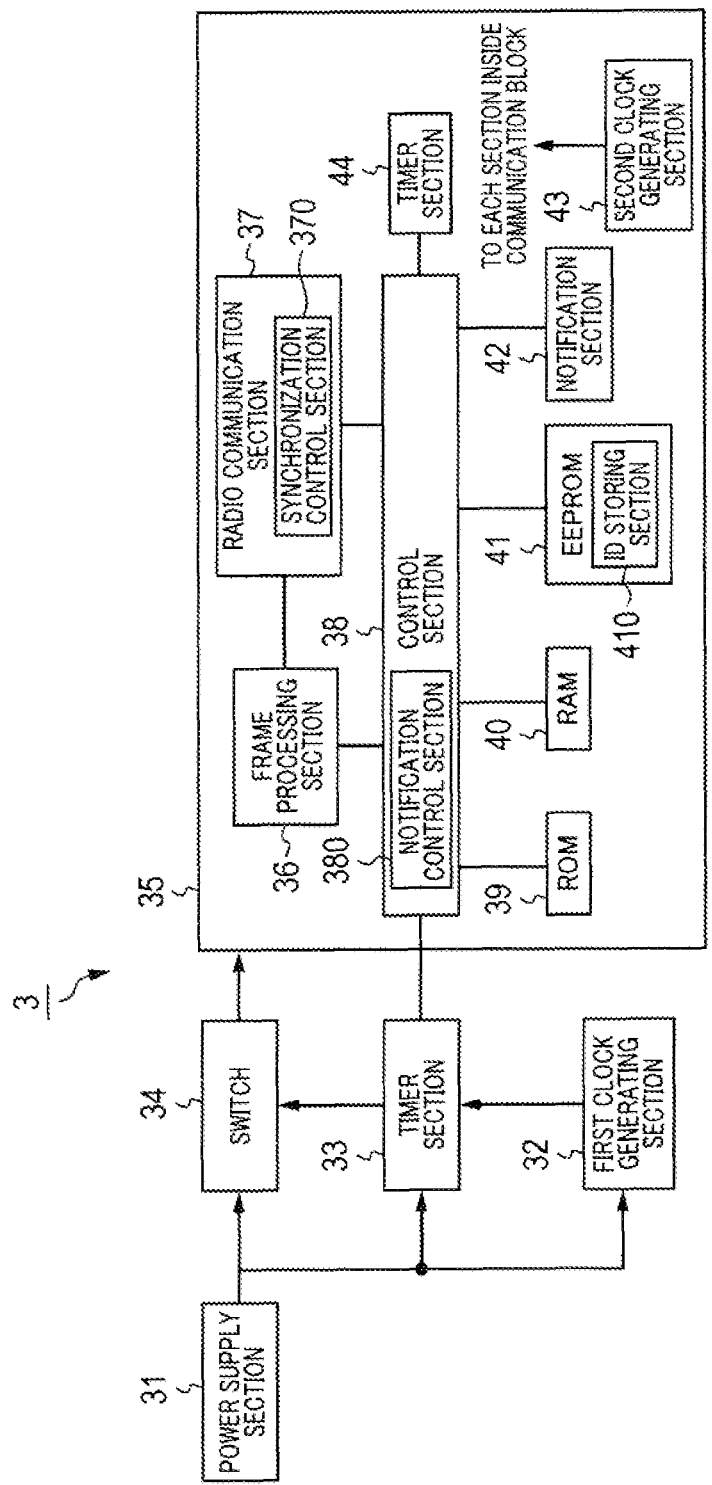
FIG. 3 is a block diagram that illustrates an example of a locator of a radio communication apparatus according to an embodiment of the present invention.

First, an example of the configuration of locator 3 will be described. FIG. 3 is a block diagram that illustrates an example of the configuration of locator 3. The configuration of locator 5 is the same as the example of the configuration illustrated in FIG. 3.

As illustrated in FIG. 3, locator 3 includes power supply section 31, first clock generating section 32, timer section 33, switch 34, and communication block 35. Communication block 35 includes frame processing section 36, radio communication section 37, control section 38, read only memory (ROM) 39, random access memory (RAM) 40, electrically erasable programmable read-only memory (EEPROM) 41, notification section 42, and second clock generating section 43.

In power supply section 31, a battery as a power source of locator 3 is loaded. For example, the power of locator 3 is turned on by inserting a battery into power supply section 31 and is turned off by taking off the battery from power supply section 31.

First clock generating section 32 generates a clock signal used for operating timer section 33 based on the power that is constantly supplied from power supply section 31. First clock generating section 32, for example, includes a crystal oscillation circuit.

Timer section 33 operates as a first timer. The first timer counts a time period set in advance as a sleep period of communication block 35 and switches switch 34 from the Off state to the On state each time when such a period expires. In other words, timer section 33 is supplied with a low-speed clock from first clock generating section 32 and performs a counting process in accordance with the low-speed clock. Timer section 33 records a value (expiration value) used for determining the sleep period in a register (not illustrated in the drawing) thereof. Then, timer section 33 counts up in accordance with a clock signal transmitted from first clock generating section 32 in a sleep state and ends the counting when the counted value arrives at the expiration value. Then, timer section 33 notifies switch 34 of the end of the counting. In other words, timer section 33 starts counting by being triggered upon the stop of power supply to communication block 35 (start of the first timer) and counts a predetermined time period during the stop of communication block 35. Then, when the counting ends (the first timer expires), timer section 33 switches switch 34 to the On state and starts supplying power to communication block 35.

In the On state, switch 34 connects communication block 35 to the battery of power supply section 31. On the other hand, in the Off state, switch 34 blocks communication block 35 from the battery of power supply section 31. Locator 3 performs an intermittent reception operation and repeats an operation of returning from a sleep period, performing a reception operation for a predetermined period, and returning to the sleep state at a predetermined period. In accordance with the notification of the end of the counting from timer section 33 described above, switch 34 is switched to the On state from the Off state and starts supplying power to communication block 35.

Second clock generating section 43 generates a clock signal used for operating each section of communication block 35 based on the power supplied from power supply section 31 via switch 34. Second clock generating section 43, for example, includes a crystal oscillation circuit. This second clock generating section 43 supplies a high-speed clock signal having a frequency higher than the low-speed clock signal of first clock generating section 32 to each section of communication block 35, and an operation for communication is controlled in accordance with this high-speed clock signal.

Radio communication section 37 receives a calling signal from calling apparatus 2 using the locator protocol and transmits a response signal in response thereto to calling apparatus 2. Radio communication section 37, for example, includes a radio antenna. Synchronization control section 370 provided in radio communication section 37 determines communication timing of a communication signal according to radio communication section 37 based on a reference clock of second clock generating section 43.

Frame processing section 36 communicates with calling apparatus 2 through radio communication section 37. Frame processing section 36, for example, includes a communication module used for performing communication compliant with a DECT mode with calling apparatus 2.

In addition, upon reception of a calling signal including an ID of locator 3 (hereinafter, referred to as a "locator ID") from calling apparatus 2, frame processing section 36 replies with a response signal. Here, a locator ID is a unique identifier that is assigned in advance.

ROM 39 stores control programs used by control section 38 and various kinds of data therein.

Control section 38 operates based on the clock signal generated by second clock generating section 43, and thereby controlling the overall operation of communication block 35. Control section 38, for example, includes a central processing unit (CPU). Control section 38 executes a control program stored in ROM 40, for example, thereby realizing the function of notification control section 380.

Notification control section 380 receives instruction information that is transmitted while being included in the calling signal from calling apparatus 2 through frame processing section 36. Then, notification control section 380 controls the operation of notification section 42 based on the received instruction information.

Timer section 44 can measure a plurality of periods of time separately. For example, timer section 44 operates as a second timer. The second timer starts counting by being triggered upon the reception of a signal from calling apparatus 2 (start of the second timer) and ends the counting in accordance with the elapse of a predetermined time period (start of the second timer). In addition, timer section 44 operates as a third timer. The third timer starts counting by being triggered upon the insertion of the battery into power supply section 31 (start of a third timer) and ends the counting in accordance with the elapse of a predetermined time period (expiration of the third timer).

RAM 40 is a working memory of control section 38.

EEPROM 41 includes ID storing section 410. ID storing section 410 stores a locator ID of locator 3 therein.

Upon reception of a calling signal from calling apparatus 2, notification section 42 outputs a notification sound that is used for the notification of the location of locator 3. Notification section 42, for example, includes a small speaker. An example of the notification sound includes a beep sound.

The functional sections included in locator 3 are not limited to those illustrated in FIG. 3, and other functional sections may be included. The other functional sections may be used either for realizing main functions of locator 3 or for realizing auxiliary functions supporting the main functions.

An example of the configuration of locator 3 has been described thus far.

Figure 4:
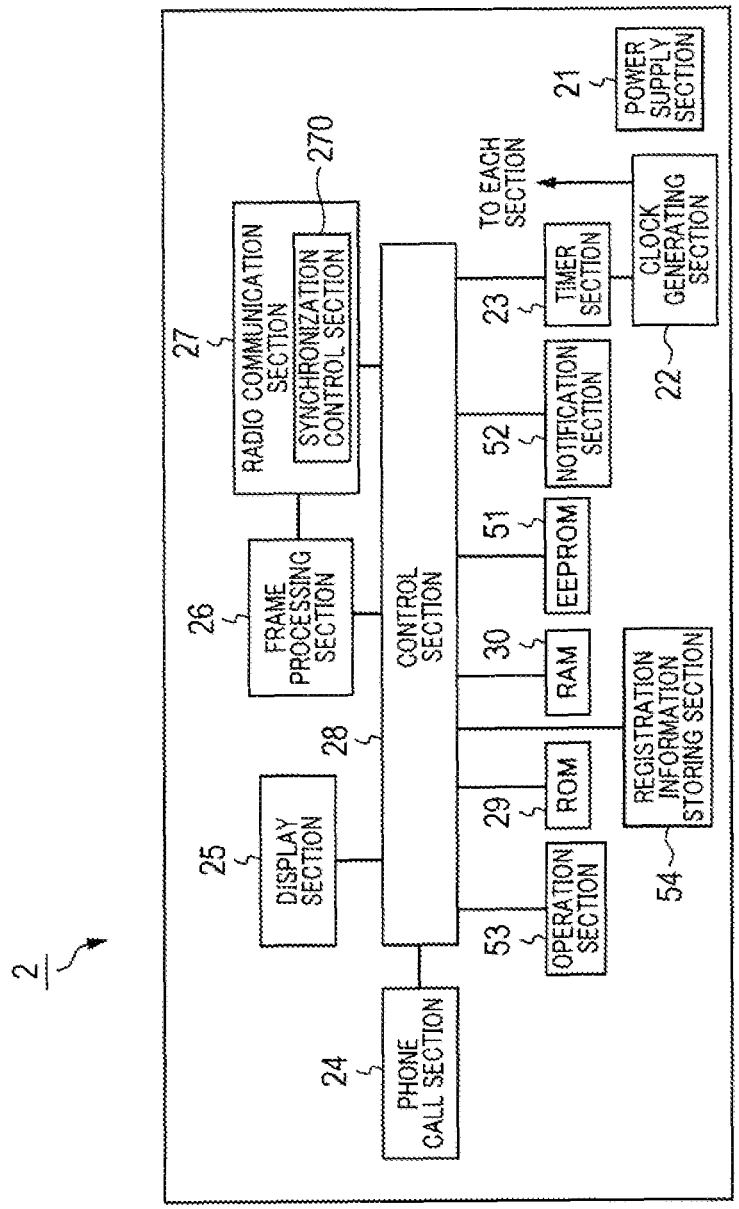
FIG. 4 is a block diagram that illustrates an example of a calling apparatus of a radio communication apparatus according to an embodiment of the present invention.

Next, an example of the configuration of calling apparatus 2 will be described. FIG. 4 is a block diagram that illustrates an example of the configuration of calling apparatus 2. The configuration of calling apparatus 4 is the same as that illustrated in FIG. 4.

As illustrated in FIG. 4, calling apparatus 2 includes power supply section 21, clock generating section 22, timer section 23, phone call section 24, display section 25, frame processing section 26, radio communication section 27, control section 28, ROM 29, RAM 30, EEPROM 51, notification section 52, operation section 53, and registration information storing section 54.

Power supply section 21 supplies power used for operating calling apparatus 2. For example, power supply section 21 includes a battery pack that is repeatedly chargeable.

Clock generating section 22 generates a clock signal used for operating each section of calling apparatus 2 based on the power supplied from power supply section 21. For example, clock generating section 22 includes a crystal oscillation circuit.

Timer section 23 measures a specified time period based on the clock signal transmitted from clock generating section 22.

Phone call section 24 is configured by a voice amplifier, a speaker, a microphone, and the like that are used for making a voice call.

Display section 25 displays registration information that is stored in registration information storing section 54. In addition, display section 25 may be used for outputting other information (for example, a telephone number, an operation menu of calling apparatus 2, and the like). For example, display section 25 includes a liquid crystal display.

Radio communication section 27 transmits a calling signal to locator 3 using the locator protocol and receives a response signal in response thereto from locator 3. Radio communication section 27, for example, includes a radio antenna. Synchronization control section 270 determines communication timing of a communication signal according to radio communication section 27 based on a reference clock of clock generating section 22.

Frame processing section 26 embeds frame transmission information matching an operation mode of that moment and transfers the frame transmission information to radio communication section 27. The frame configuration of DECT is used when communication with base unit 1 is performed, and the frame configuration of the locator is used when communication with locator 3 is performed. When communication with locator 3 is performed, the locator protocol that is partially changed with the DECT mode used as the base in accordance with the use of the locator is used for the communication.

Frame processing section 26 transmits a calling signal requesting a reply with a response signal to locator 3 at the time of a start operation which is to receive a start operation and an end operation of a mode searching for locator 3 (hereinafter, referred to as a "locator mode") from a user through operation section 53. At this time, frame processing section 26 includes identification information of a locator selected by control section 28 in the calling signal. In addition, frame processing section 26 includes instruction information that indicates whether there is a notification in the locator selected by control section 28 in the calling signal.

Control section 28 controls the overall operation of calling apparatus 2 in cooperation with the above-described sections. A control process performed by control section 28 will be described later. Control section 28, for example, includes a CPU.

ROM 29 stores control programs used by control section 28 and various kinds of data therein.

RAM 30 and EEPROM 51 are working memories of control section 28.

Upon reception of a calling signal from base unit 1, notification section 52 outputs a notification sound. Notification section 52, for example, includes a small speaker.

Operation section 53 includes buttons used for receiving user's various operations. Operation section 53, for example, includes a touch panel placed on the surface of the liquid crystal display. Examples of the user's operations include an operation to register locator 3 (locator registration operation), an operation to call locator 3 (calling operation), and an operation to stop a notification sound of locator 3 (operation to mute the sound).

Registration information storing section 54 stores an ID of calling apparatus 2 (hereinafter, referred to as a "calling apparatus ID"). Here, the calling apparatus ID is a unique identifier that is assigned in advance. In addition, for example, when a locator ID (an example of the registration information) can be acquired from locator 3, which is a registering party, registration information storing section 54 stores the locator ID.

The functional sections included in calling apparatus 2 are not limited to those illustrated in FIG. 3 and may include other functional sections. The other functional sections may be used either for realizing main functions of calling apparatus 2 or for realizing auxiliary functions supporting the main functions.

An example of the configuration of calling apparatus 2 has been described thus far.

Figure 5:
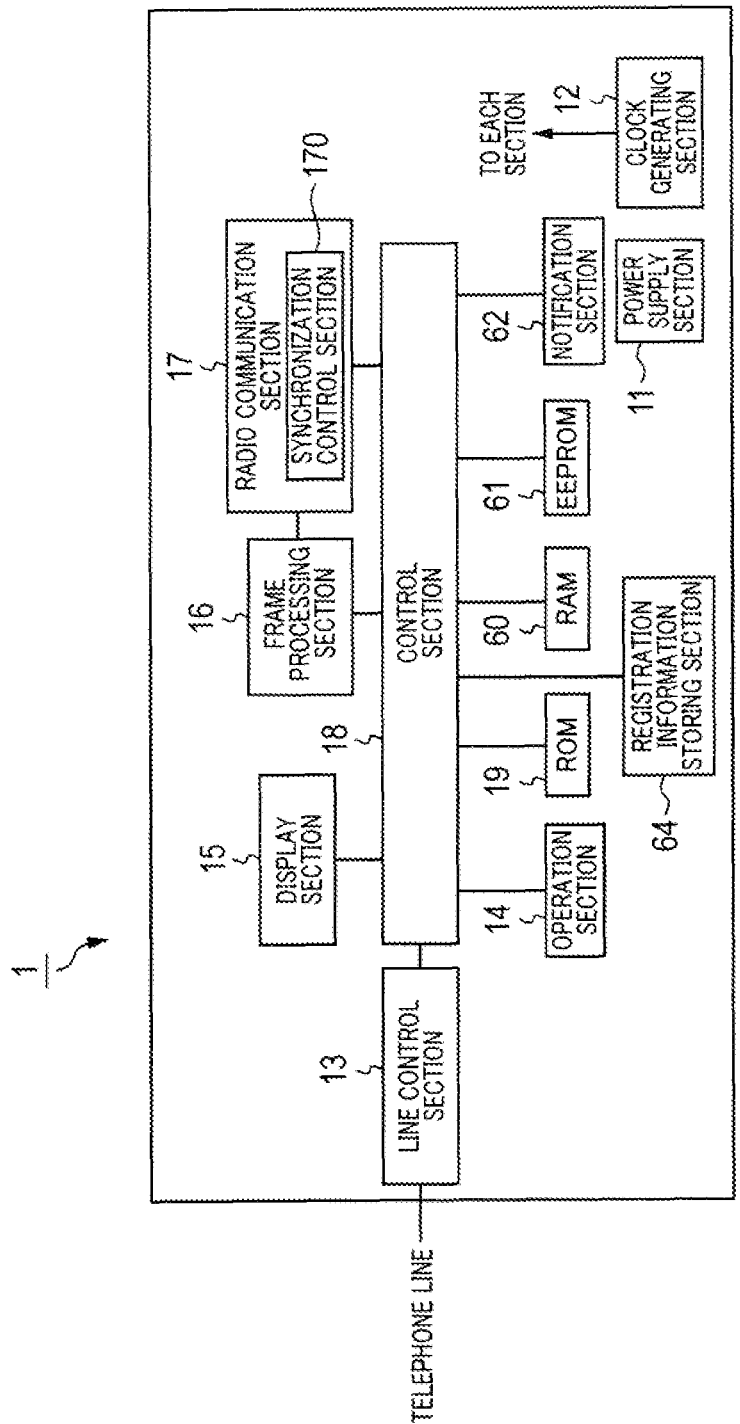
FIG. 5 is a block diagram that illustrates an example of a base unit of a radio communication apparatus according to an embodiment of the present invention.

Next, an example of the configuration of base unit 1 will be described. FIG. 5 is a block diagram that illustrates the example of the configuration of base unit 1.

As illustrated in FIG. 5, base unit 1 is equipped with power supply section 11, clock generating section 12, line control section 13, operation section 14, display section 15, frame processing section 16, radio communication section 17, control section 18, ROM 19, RAM 60, EEPROM 61, notification section 62, and registration information storing section 64.

Power supply section 11 supplies power that is used for operating base unit 1.

Clock generating section 12 generates a clock signal used for operating each section of base unit 1 based on the power that is supplied from power supply section 11. Clock generating section 12, for example, includes a crystal oscillation circuit.

Line control section 13 communicates with a wired telephone network.

Operation section 14 includes buttons used for receiving user's various operations. Operation section 14, for example, includes a touch panel placed on the surface of the liquid crystal display.

Display section 15 displays registration information that is stored in registration information storing section 64. In addition, display section 15 may be used for outputting other information (for example, a telephone number, an operation menu of base unit 1, or the like). Display section 15, for example, includes a liquid crystal display.

Frame processing section 16 embeds frame transmission information matching an operation mode of that moment and transfers the frame transmission information to radio communication section 17. The frame configuration of DECT is used when communication with calling apparatus 2 is performed, and the frame configuration of the locator is used when communication with locator 3 is performed.

Radio communication section 17 performs radio communication with calling apparatus 2 using a communication protocol of time division multiple access (TDMA)/time division duplex (TDD). In this embodiment, radio communication section 17 performs radio communication, for example, using the protocol of digital enhanced cordless telecommunications (DECT). Synchronization control section 170 determines communication timing of a communication signal according to radio communication section 17 based on the reference clock of clock generating section 12.

Control section 18 controls the overall operation of base unit 1 in corporation with the above-described sections. For example, control section 18 includes a CPU.

ROM 19 stores control programs used by control section 18 and various kinds of data therein.

RAM 60 and EEPROM 61 are working memories of control section 18.

When a calling signal is received from line control section 13, notification section 62 outputs a notification sound. Notification section 62, for example, includes a small speaker.

Registration information storing section 64 stores the ID of calling apparatus 2.

An example of the configuration of base unit 1 has been described thus far.

Figure 11:
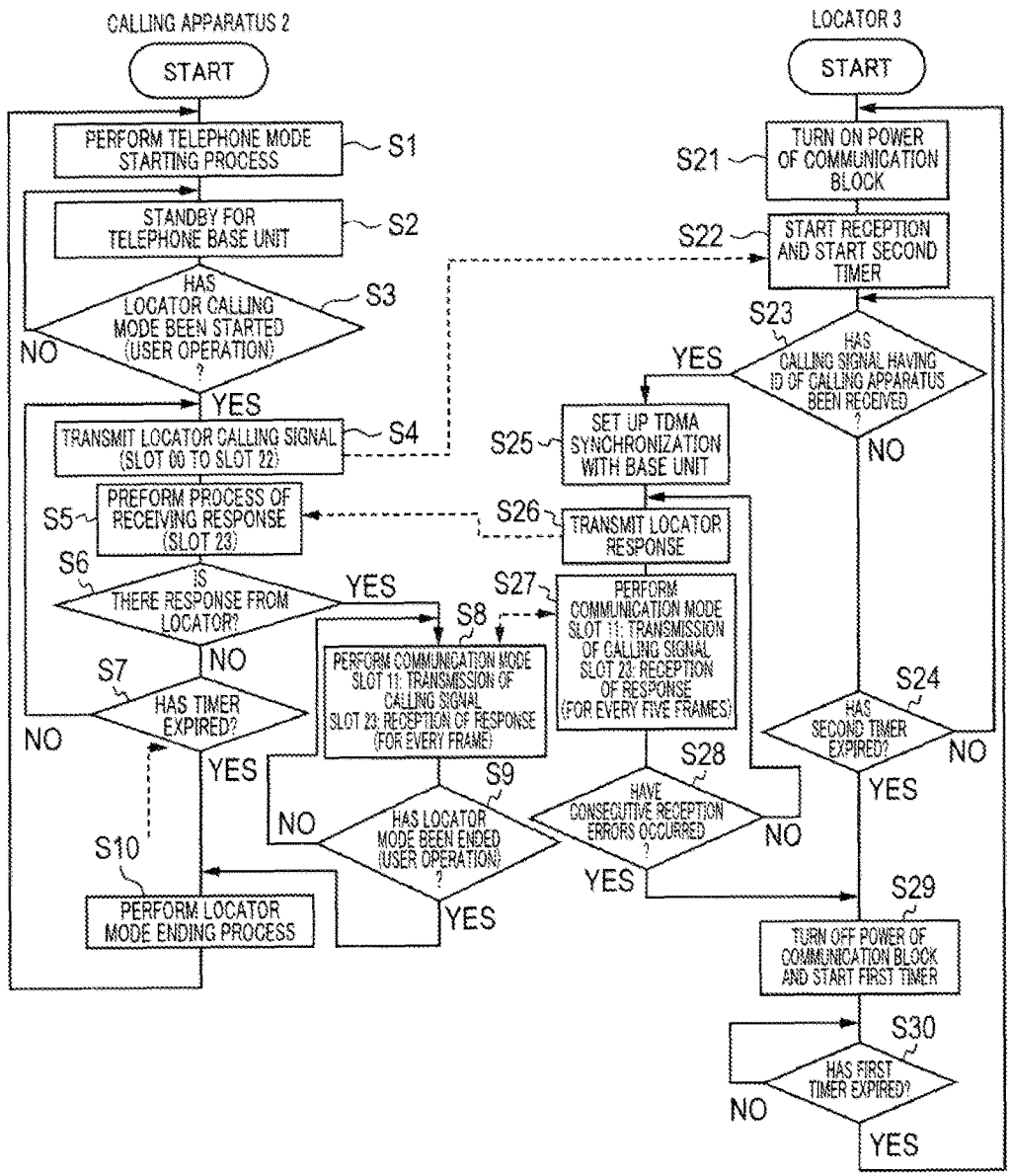
FIG. 11 is a flowchart that illustrates an example of the communication operation of a locator system according to an embodiment of the present invention.

Next, an example of the operation of the locator system described above will be described. FIG. 11 is a flowchart that illustrates an example of a normal operation of this locator system.

In Step S1, control section 28 of calling apparatus 2 that has been supplied with power and has started the operation starts a telephone mode. In the telephone mode, calling apparatus 2 can make a phone call with another telephone, which is connected through a public telephone network, via base unit 1.

In Step S2, control section 28 instructs radio communication section 27 to receive a control signal from base unit 1 and controls calling apparatus 2 to be in a standby state for base unit 1.

In Step S3, control section 28 determines whether or not operation section 53 has received an operation of calling a locator.

In a case where operation section 53 has not received an operation of calling a locator (No in Step S3) as a result of the determination made in Step S3, the flow is returned to Step S2. On the other hand, in a case where operation section 53 has received an operation of calling the locator (Yes in Step S3) as a result of the determination made in Step S3, a locator calling mode is started, and the flow proceeds to Step S4. In addition, a timer used for defining a time limit during which the locator calling mode lasts in timer section 33 is started in accordance with the operation of calling the locator.

In Step S4, control section 28 transmits a locator calling signal used for calling locator 3 (outputting a notification sound from locator 3) from radio communication section 27. In addition, control section 28 starts timer section 23 by being triggered upon the transmission of the locator calling signal. Accordingly, timer section 23 starts counting a time period set in advance. In the locator calling signal, a locator ID representing a locator that is a calling target is included.

Meanwhile, locator 3 operates as follows.

In Step S21, power is supplied to communication block 35, for example, by inserting a battery.

In Step S22, control section 38 of locator 3 instructs radio communication section 37 to start a reception operation. In addition, a second timer is started by timer section 44 that counts high-speed clock signals supplied from second clock generating section 43 by being triggered by radio communication section 37 starting the reception of a locator calling signal. In accordance with the start of the second timer, control section 38 sets locator 3 to be in a state capable of registering with calling apparatus 2 in one-to-one correspondence. In Step S22, control section 38 instructs radio communication section 37 to receive a locator calling signal transmitted from calling apparatus 2.

In Step S23, control section 38 determines whether or not a locator calling signal including the ID thereof has been received.

In a case where a locator calling signal including the ID has not been received as a result of the determination made in Step S23 (No in Step S23), the flow proceeds to Step S24. On the other hand, in a case where a locator calling signal including the ID has been received as a result of the determination made in Step S23 (Yes in Step S23), the flow proceeds to Step S25.

In Step S24, control section 38 determines whether or not the second timer has expired. In a case where the second timer has not expired (No in Step S24) as a result of the determination made in Step S24, the flow is returned to Step S23. On the other hand, in a case where the second timer has expired (Yes in Step S24) as a result of the determination made in Step S24, the flow proceeds to Step S29.

In a case where a locator calling signal including the above-described ID has been received, in Step S25, control section 38 sets up TDMA synchronization with calling apparatus 2 that is a transmission source of the locator calling signal via radio communication section 37.

In Step S26, control section 38 transmits a locator response signal from radio communication section 37 by instructing radio communication section 37 to transmit the locator response signal that is a response to the locator calling signal from radio communication section 37.

Meanwhile, after the locator calling signal is transmitted, calling apparatus 2 operates as follows.

In Step S5, calling apparatus 2 performs the process of receiving a response from locator 3 until the timer of timer section 23 expires.

In Step S6, control section 28 of calling apparatus 2 determines whether or not radio communication section 27 has received the locator response signal from locator 3.

In a case where radio communication section 27 has not received the locator response signal (No in Step S6) as a result of the determination made in Step S6, the flow proceeds to Step S7. On the other hand, in a case where radio communication section 27 has received the locator response signal (Yes in Step S6) as a result of the determination made in Step S6, the flow proceeds to Step S8.

In Step S7, control section 28 determines whether or not the timer of timer section 33 has expired.

In a case where the timer of timer section 33 has not expired (No in Step S7) as a result of the determination made in Step S7, the flow is returned to Step S4. On the other hand, in a case where the timer of timer section 33 has expired (Yes in Step S7) without receiving the locator response signal as a result of the determination made in Step S7, the flow proceeds to Step S10.

In Step S8, according to the locator protocol described above, calling apparatus 2 serves as a synchronization master, locator 3 receives the locator calling signal transmitted from calling apparatus 2, and calling apparatus 2 receives the locator response signal transmitted from locator 3.

In Step S9, control section 28 determines whether or not operation section 53 has received an operation of ending the locator calling mode.

In a case where the operation of ending the calling mode has not been received by operation section 53 (No in Step S9) as a result of the determination made in Step S9, the flow is returned to Step S8. On the other hand, in a case where the operation of ending the calling mode has been received by operation section 53 (Yes in Step S9) as a result of the determination made in Step S9, the flow proceeds to Step S10.

In Step S10, control section 28 performs the process of ending the locator calling mode.

After the locator response signal is received in Step S26, locator 3 operates as follows.

In Step S27, locator 3 receives a locator calling signal and transmits a locator response signal in synchronization with calling apparatus 2 in accordance with the locator protocol.

In Step S28, control section 38 of locator 3 monitors whether or not consecutive reception errors occur.

In a case where consecutive reception errors do not occur (No in Step S28) as a result of the monitoring performed in Step S28, the flow is returned to Step S26. On the other hand, in a case where consecutive reception errors occur (Yes in Step S28) as a result of the monitoring performed in Step S28, the flow proceeds to Step S29. In addition, when the second timer expires as described above (Yes in Step S24), the flow proceeds to Step S29.

In Step S29, control section 38 blocks the power supplied to communication block 35. As a result, the communication operation of locator 3 is stopped. In locator 3, the first timer is started by timer section 33, which counts low-speed clock signals supplied from first clock generating section 32, by being triggered upon the blocking of the power supplied to communication block 35. Thereafter, the first timer counts up while the communication operation of locator 3 is stopped.

In Step S30, control section 38 determines whether or not the first timer has expired.

In a case where the first timer has not expired (No in Step S30) as a result of the determination made in Step S30, control section 38 determines the process of Step S30 again. On the other hand, in a case where the first timer has expired (Yes in Step S30) as a result of the determination made in Step S30, control section 38 returns the process again to Step S21. Then, in Step S21, when power is supplied to communication block 35, control section 38 instructs radio communication section 37 to start a reception operation in Step S22. Thereafter, the above-described operations of Step S23 and subsequent steps are performed again.

In this way, by the operation of calling the locator using operation section 53 of calling apparatus 2, calling apparatus 2 communicates with locator 3 by radio using the locator protocol. In addition, locator 3 can receive the locator calling signal transmitted from calling apparatus 2 by performing a reception operation regularly using the counting of the first timer. In such a case, locator 3 corrects communication timing in accordance with the timing of receiving a control signal from calling apparatus 2 in synchronization with a control signal transmitted from calling apparatus 2, which is the master.

The normal operation of the locator system has been described thus far.

Figure 6:
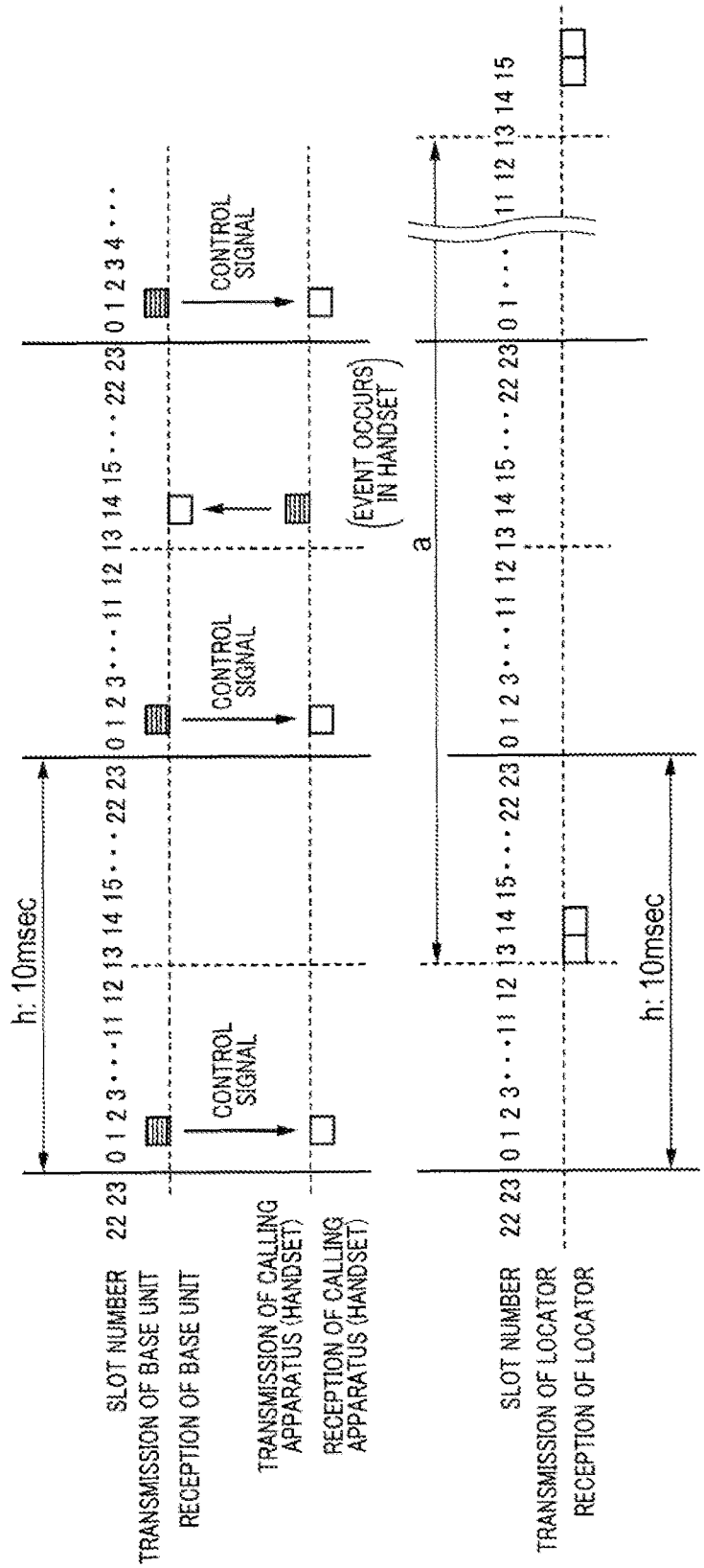
FIG. 6 is a timing diagram that illustrates the operation of a radio communication apparatus according to an embodiment of the present invention.

Next, an example of the configuration of a communication frame in TDMA communication used in this embodiment will be described with reference to FIG. 6. FIG. 6 illustrates an example of the operations of base unit 1, calling apparatus 2, and locator 3 in the normal state.

In radio communication according to DECT, for example, as illustrated in FIG. 6, a time division mode is used in which communication is performed by setting 10 msec as one frame and dividing one frame into 24 slots. Base unit 1 transmits the base unit ID using a control signal, and calling apparatus 2 acquires the base unit ID while receiving the control signal, compares the acquired base unit ID with the ID of a base unit (registered base unit) for which calling apparatus 2 stands by, and selects a base unit to be synchronized with. In addition, at the standby time, calling apparatus 2 transmits nothing to base unit 1 for every frame, and transmission from calling apparatus 2 to base unit 1 is performed only when an event (an outgoing call or the like) occurs or a phone call state occurs in calling apparatus 2. In such a case, calling apparatus 2 selects one slot and performs communication using upstream and downstream slots of the slot.

Base unit 1 constantly transmits a control signal in a predetermined slot for each frame. A control signal serving as a synchronization signal includes synchronization data (for example, Syncword). The Syncword is a known digit sequence determined in advance for timing synchronization and is synchronization information used for the synchronization of calling apparatus 2. The reception side starts cutting out and taking in a frame at a time point when this known digit sequence is found.

In the DECT mode, a unique Syncword is assigned to each network, and the Syncword is included to be common to signals transmitted from terminals. In the locator protocol to be described next, the synchronization method is the same, and the Syncword is included in a locator calling signal transmitted from calling apparatus 2, whereby the locator can be synchronized with calling apparatus 2.

Figure 8:
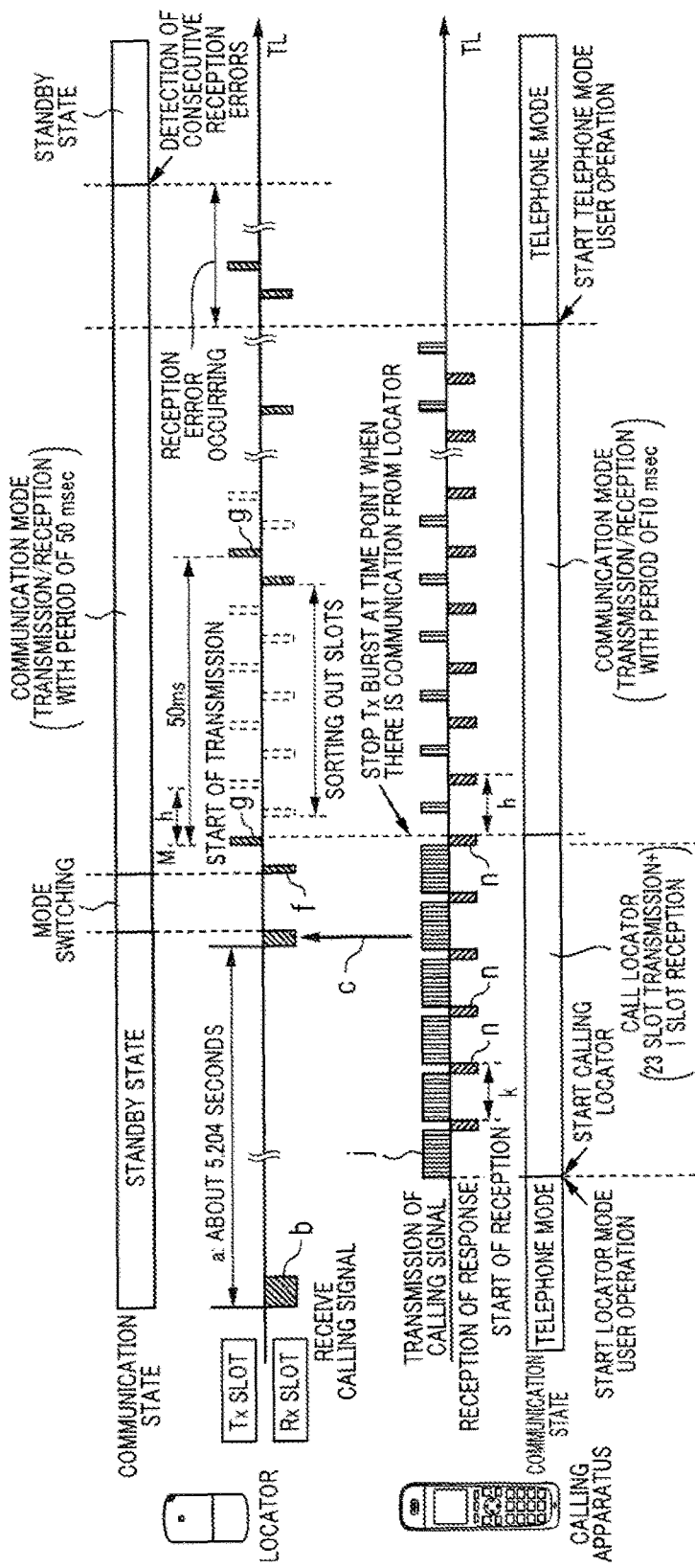
FIG. 8 is a timing diagram that illustrates an example of the communication operations of a locator and a calling apparatus of a radio communication apparatus according to an embodiment of the present invention.
Figure 9:
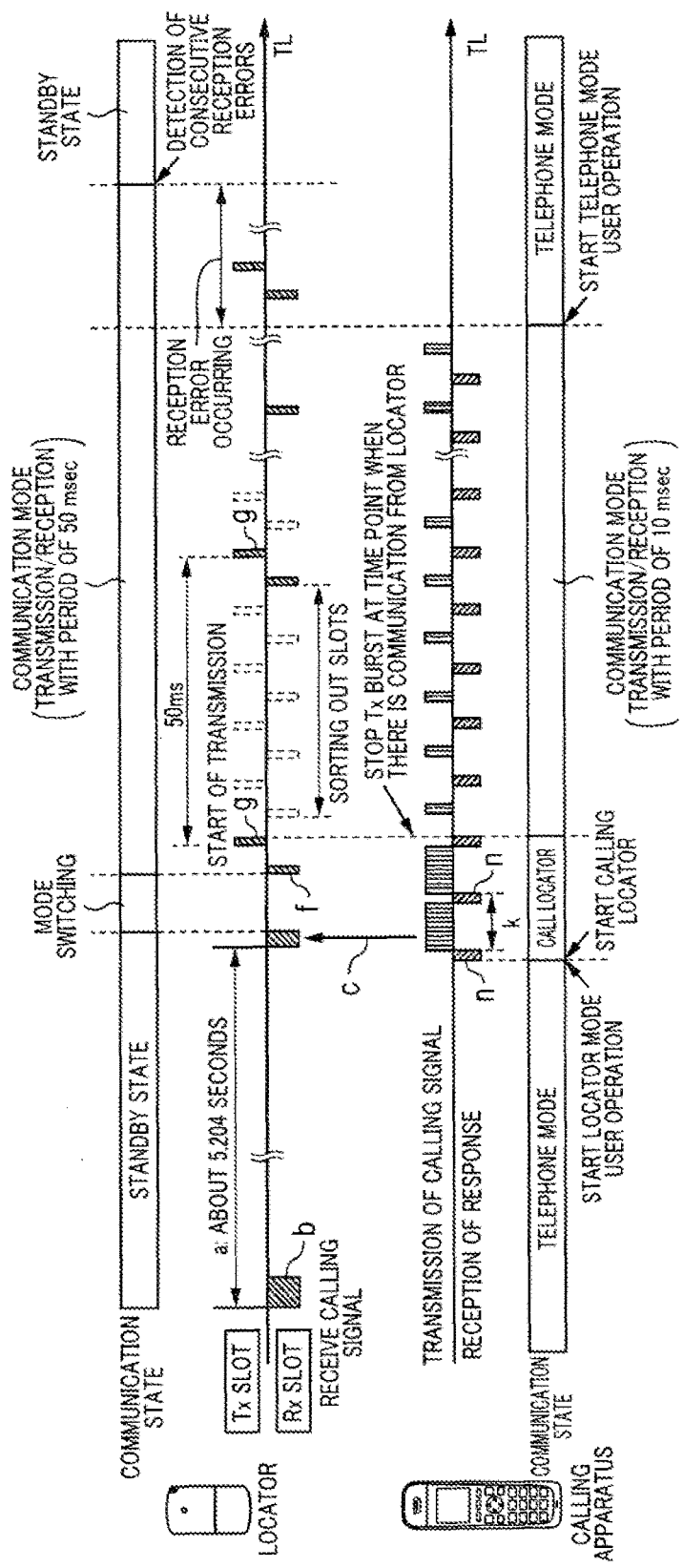
FIG. 9 is a timing diagram that illustrates a communication operation in a case where communication starts right after a calling apparatus of a radio communication apparatus according to an embodiment of the present invention is called.

Hereinafter, an example of the operation performed when calling apparatus 2 calls locator 3 in the above-described locator system will be described with reference to FIGS. 8 and 9. FIG. 8 is a timing diagram that illustrates communication operations of the calling apparatus and the locator. FIG. 9 is a timing diagram that illustrates a communication operation when communication is started right after calling by the calling apparatus.

In FIGS. 8 and 9, TL represents the time axis, and the time is assumed to advance from the left to the right in the drawings. In each drawing, the upper side of the time axis TL represents a transmission slot (or a transmission signal) and the lower side of the time axis TL represents a reception slot (or a reception signal). In addition, in each drawing, locator 3 is assumed to have been registered in advance in one-to-one correspondence with calling apparatus 2.

First, for example, when a battery is inserted into power supply section 31, locator 3 proceeds to be in a state (call standby state) of standing by for the reception of a calling signal transmitted from calling apparatus 2. At this time, as illustrated in FIG. 8, control section 38 controls radio communication section 37 so as to receive a calling signal using reception slot b and controls timer section 33 so as to start period a.

Timer section 33 counts low-speed clock signals generated by first clock generating section 32. When the counted value of timer section 33 increases to an expiration value, switch 41 is switched from the Off state to the On state. Through this switching, the supply of power to radio communication section 37 is started. Then, radio communication section 37 starts an operation so as to receive a calling signal using reception slot b.

Figure 13:
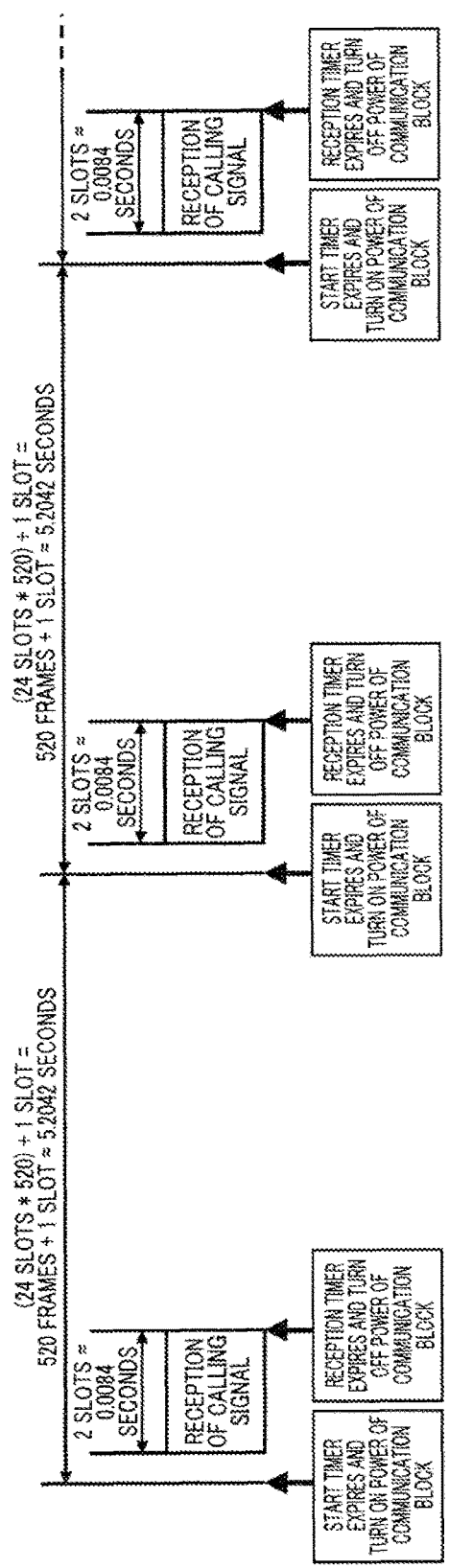
FIG. 13 is an explanatory diagram that illustrates the operation of a locator of a radio communication apparatus according to an embodiment of the present invention.

Here, period a and reception slot b will be described. FIG. 13 is a diagram that illustrates period a and reception slot b illustrated in FIG. 8 in an enlarged scale.

As illustrated in FIG. 13, period a corresponds to 24 slots (one frame)×520+1 slots, in other words, 520 frames+1 slot and is about 5.204 seconds. Here, "520" described above is a predetermined number, and this number of frames used herein is not limited to this example. The reason for adding one slot is to avoid radio wave interference with different communication by delaying the reception timing of a calling signal by one slot for each period. Accordingly, the number of added slots is not limited to one, and may be three, seven, or the like.

As illustrated in FIG. 13, reception slot b is two consecutive slots and is about 0.0084 seconds. The reason for reception slot b being two consecutive slots is as follows. While locator 3 needs to receive a calling signal corresponding to one slot from calling apparatus 2, locator 3 and calling apparatus 2 are not synchronized with each other during the call standby. Accordingly, it is difficult for locator 3 to receive only a calling signal corresponding to one slot. Thus, allowing locator 3 to receive a calling signal corresponding to two consecutive slots makes it possible to receive a calling signal corresponding to one slot even while locator 3 and calling apparatus 2 are not synchronized with each other. In other words, two consecutive slots are the minimal interval that allows locator 3 to receive a calling signal corresponding to one slot even while locator 3 and calling apparatus 2 are not synchronized with each other. Here, although the number of slots is described as being two as an example, the number of slots is not limited thereto.

Period a and reception slot b have been described thus far.

Next, a calling operation for calling locator 3 from calling apparatus 2 is performed will be described. First, the operations of a calling apparatus and a locator of a radio communication apparatus according to a related art will be described with reference to FIG. 7.

Figure 7:
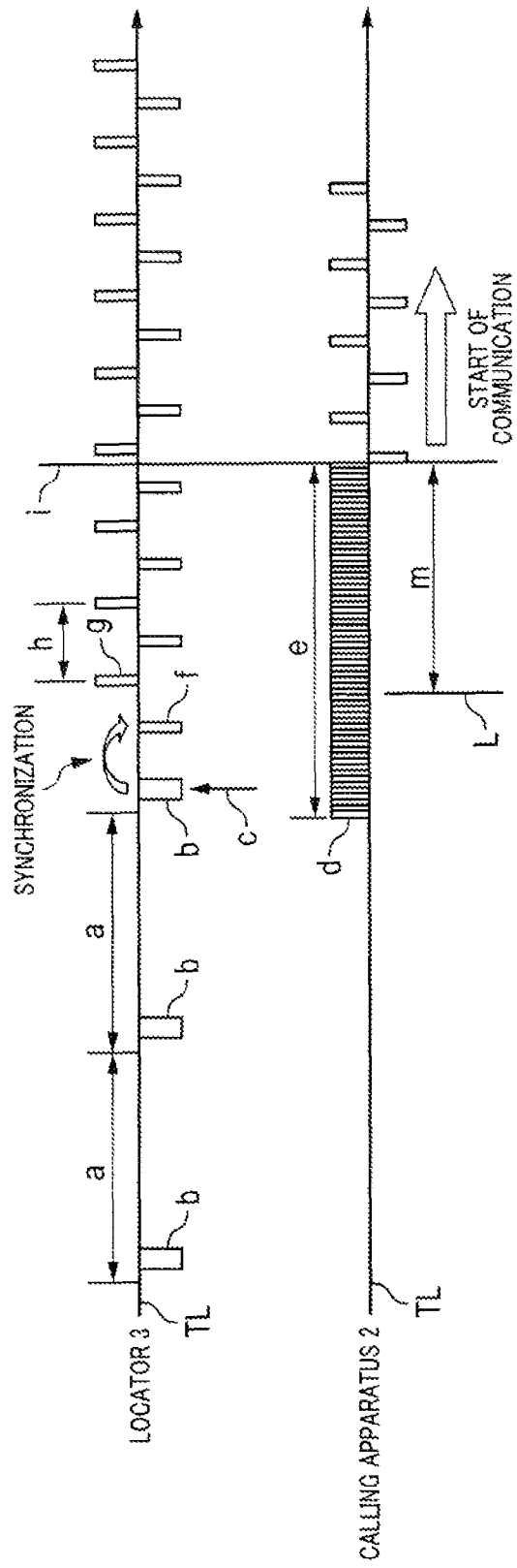
FIG. 7 is a timing diagram that illustrates the communication operation of a calling apparatus and a locator of a radio communication apparatus according to related art.

When a user performs a predetermined calling operation in the calling apparatus during the standby state of the locator, calling signals are consecutively transmitted during a certain time period (time period set in advance: e) from calling apparatus 2. In FIG. 7, d represents calling signals that are consecutively transmitted, and e represents a certain time period during which the transmission of calling signals is continued. The consecutive transmission of calling signals d is performed using transmission slots. In addition, the certain time period e, for example, is about six seconds. The reason for the certain time period being six seconds is to allow locator 3 to receive calling signals by setting the certain time period slightly longer than period a, which is about 5.204 seconds.

In a case where the locator performs a reception operation using reception slot b while calling apparatus 2 consecutively transmits calling signals d, the radio communication section receives calling signal c corresponding to one slot out of calling signals d that are consecutively transmitted, using reception slot b. At this time, by being triggered upon the reception of calling signal c, in order to receive subsequent calling signals, the radio communication section is synchronized with the transmission of calling signals from the calling apparatus. In FIG. 7, f represents a reception slot after the synchronization. Although not illustrated in the drawing, the reception period of the calling signal after the synchronization is about 10 ms.

The locator then transmits a response signal for the received calling signal. In FIG. 7, g represents a transmission slot that is used for the transmission of the response signal, and h represents the transmission period of the response signal. In addition, similar to the reception period of the calling signal, h is about 10 ms. However, as illustrated in FIG. 7, the transmission timing of the calling signal and the reception timing of the response signal are different from each other.

In this way, in the example illustrated in FIG. 7, while a response signal is transmitted from the locator every period h, response signals thereof are not received by the calling apparatus during certain time period e. The reason for this is that, although calling signal c is received by the locator, the calling apparatus does not stop the consecutive transmission of calling signals d and continues the transmission until certain time period e elapses. The calling apparatus starts the reception of the response signal from time point i when the transmission of calling signals d ends after constant time e elapses. In this manner, in a case where calling signals d are uselessly transmitted even after the reception thereof by the locator, there are disadvantages of interrupting communication of the other apparatuses and delaying the reception of a response signal from the locator by the calling apparatus. In FIG. 7, m represents a period during which calling signals d are uselessly transmitted.

Thus, in an embodiment of the present invention, in order to stop useless transmission of calling signals described above, as illustrated in FIG. 8, there is a feature in the transmission of calling signals from calling apparatus 2. Hereinafter, a description will be provided with reference to FIG. 8.

First, similar to the case illustrated in FIG. 7, when a user performs a calling operation in calling apparatus 2 during the call standby of locator 3, the transmission of calling signals is started. In other words, as illustrated in FIG. 8, when operation section 53 receives a calling operation in calling apparatus 2, control section 28 starts timer section 23 and performs control such that, first, calling signals j are consecutively transmitted from radio communication section 27 during a predetermined number of slots. Calling signals j are transmitted until timer 23 ends the counting of a time period set in advance. Control section 28 then stands by for the reception of a response signal using reception slot n. The time period of consecutive transmission of calling signals j is shorter than that of calling signals d illustrated in FIG. 7. Period k corresponding to a period from the start of transmission of calling signal j to the reception standby (standing by for the reception) of a response signal using reception slot n is repeated.

Control section 28 of calling apparatus 2 transmits a calling signal during a predetermined time period (for example, time period e). However, radio communication section 27 is controlled so as to perform a reception operation not continuously but regularly during period k for only one slot (slot n) and to perform a reception standby operation for receiving a response signal from locator 3. In a case where calling apparatus 2 cannot receive a response signal from locator 3 in a normal way, control section 28 performs control such that the transmission of calling signal j and the reception standby for a response signal are repeated during period k until calling apparatus 2 receives the response signal from locator 3.

In a case where a response signal is not received until timer section 23 ends counting of a time (for example, constant time e) set in advance, control section 28 stops the transmission of calling signal j and the reception waiting for a response signal.

As illustrated in FIG. 8, when locator 3 can receive calling signal c in one slot included in calling signal j, calling apparatus 2 receives a response signal that is transmitted from locator 3 using slot n after the slot. Control section 28 stops the consecutive transmission of calling signals j by being triggered upon the reception of the response signal. Thereafter, locator 3 receives a control signal that is regularly transmitted from calling apparatus 2 and is synchronized with calling apparatus 2 by regularly transmitting a signal from locator 3 to calling apparatus 2. Locator 3 transmits a response signal using transmission slot g, and the response signal is received by calling apparatus 2. This point will be described later in detail.

Figure 12:
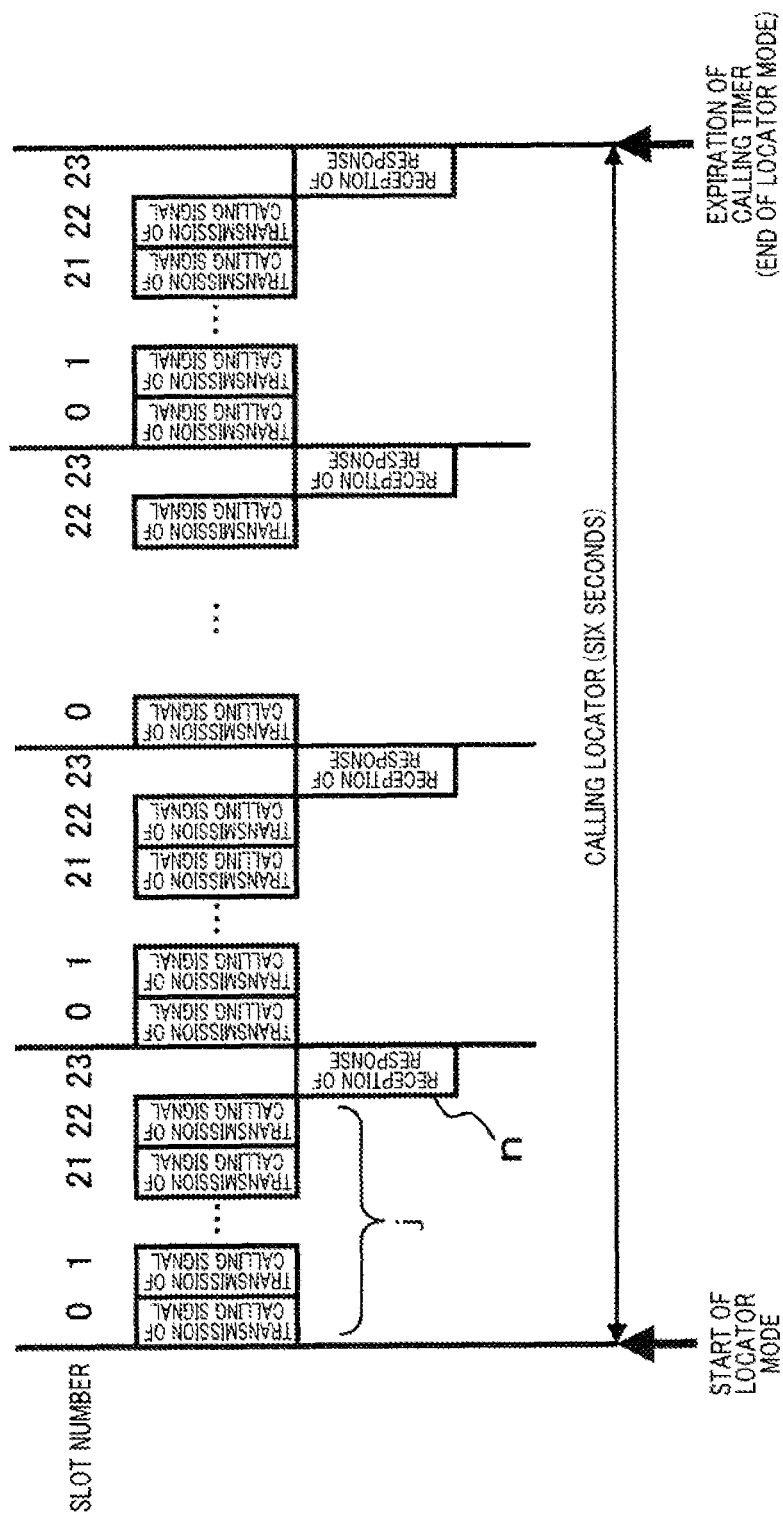
FIG. 12 is an explanatory diagram that illustrates operations from the start of calling a locator to the end of a called timer in a calling apparatus according to an embodiment of the present invention.

Here, the transmission slot and the reception slot in period k will be described. FIG. 12 is a diagram that illustrates the transmission slot and the reception slot in period k illustrated in FIG. 8 in an enlarged scale.

As illustrated in FIG. 12, in period k, calling apparatus 2 performs transmission and reception using 24 slots having slot numbers 0 to 23. In the example illustrated in FIG. 12, 22 slots having slot numbers of 0 to 22 are transmission slots used for transmitting calling signals j. One slot having slot number 23 is reception slot n that is used for receiving a response signal from locator 3. In other words, calling apparatus 2 consecutively transmits calling signals j in the order of slot numbers 0 to 22. Then, after the transmission of a signal of a slot having slot number 22, calling apparatus 2 stands by for the reception of a response signal using a slot having slot number 23.

The transmission slot and the reception slot in period k have been described thus far.

Next, the operation performed until locator 3 is synchronized with calling apparatus 2 from the standby state of locator 3 after a calling apparatus 2 performs a calling operation will be described in detail with reference to FIG. 10. In the example illustrated in FIG. 10, locator 3 is in the standby state and stands by for reception of response signals in slots having slot numbers 16 and 17.

When operation section 53 of calling apparatus 2 receives a calling operation, control section 28 starts timer section 23 and performs control such that transmission and reception of period k are repeated. In other words, control section 28 consecutively transmits calling signals j using 23 transmission slots through radio communication section 27. Then, right after the consecutive transmission of calling signals j, control section 28 performs control such that calling apparatus 2 stands by for receiving a response signal from locator 3 using one reception slot n.

Figure 10:
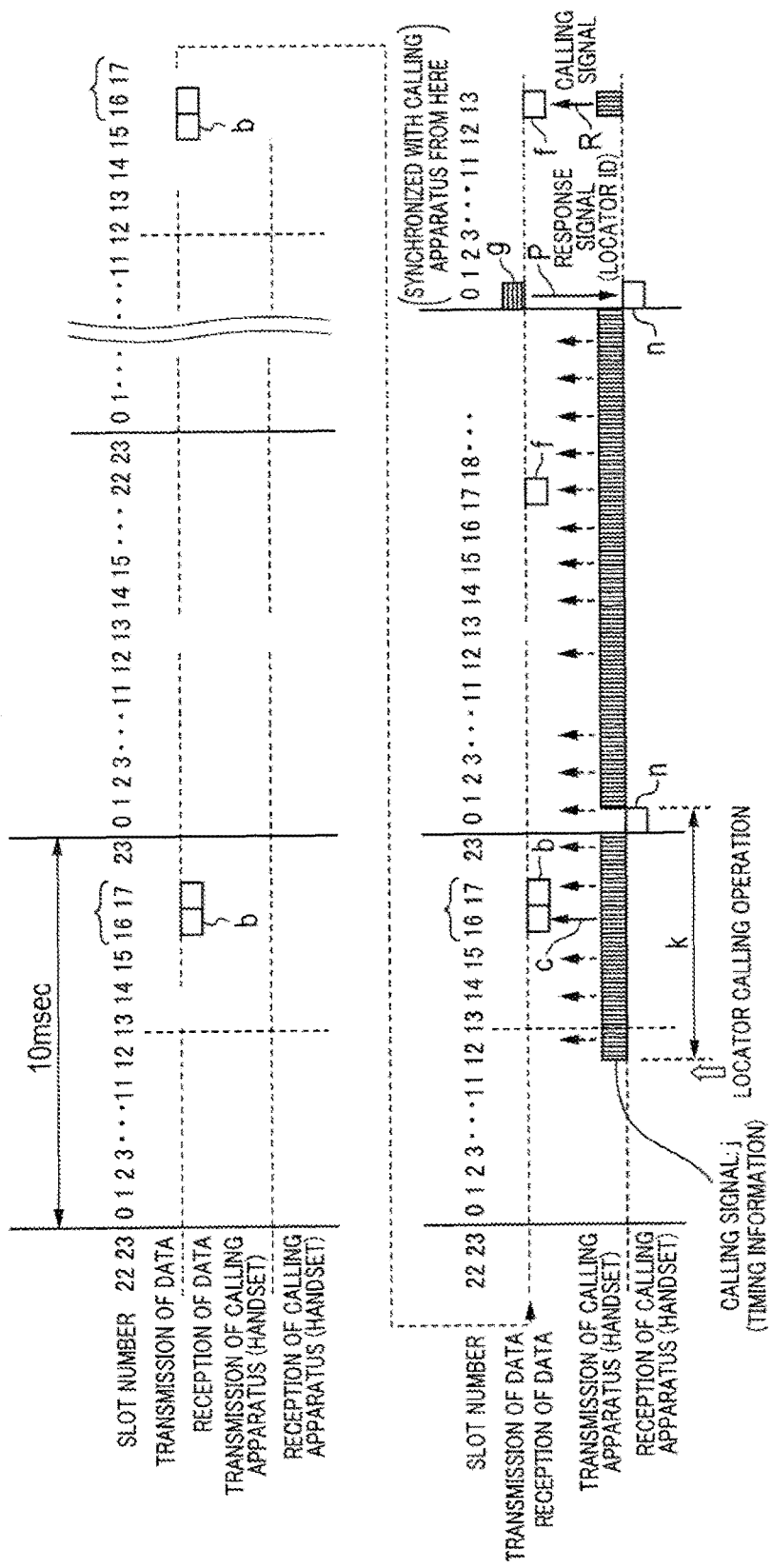
FIG. 10 is a timing diagram that illustrates an example of the operations of a locator and a calling apparatus of a radio communication apparatus according to an embodiment of the present invention.

In the example illustrated in FIG. 10, state "C" is formed in which locator 3 receives a calling signal using the first reception slot (slot number 16) after calling apparatus 2 starts the consecutive transmission of calling signals j, and locator 3 receives reception timing information that is transmitted with a calling signal by calling apparatus 2. Locator 3 extracts information of a transmission slot used for transmitting a response signal based on the reception timing information and starts preparing the transmission of the response signal. In the example illustrated in FIG. 10, transmission slot g used for transmitting a response signal is a slot having slot number 0. However, a response signal is not transmitted using a slot having slot number 0 that is right after a slot (slot number 16) in which the calling signal is received first as described above, and a response signal is transmitted first in a slot having slot number 0 that comes next.

Upon reception of a response signal from locator 3 in slot g (slot having slot number 0) without any problem, calling apparatus 2 can know that calling signal j has been received by locator 3. Thereafter, calling apparatus 2 stops the consecutive transmission of calling signals and switches to the transmission of basic frame period h. In other words, calling apparatus 2 regularly transmits calling signal R during period h, and locator 3 that has received calling signal R regularly transmits response signal P to calling apparatus 2.

As described above, control section 28 of calling apparatus 2 transmits a calling signal during a predetermined time period (for example, constant time e), performs a reception operation not consecutively but regularly only for one slot in period k (slot n), and controls radio communication section 27 so as to perform a reception standby operation for receiving a response signal from locator 3. In a case where a response signal cannot be received from locator 3 in a normal way, control section 28 performs control such that the transmission of calling signal j and the reception standby for a response signal are repeated in period k until a response signal is received from locator 3. On the other hand, in a case where a response signal has not been received until timer section 23 ends the counting of a predetermined time period (for example, certain time period e), control section 28 stops the transmission of calling signal j and the reception standby for a response signal.

In FIG. 7, L represents a time point at which a first response signal is transmitted from locator 3. In the case illustrated in FIG. 7, while calling apparatus 2 cannot receive a response signal at timing L, in the case illustrated in FIG. 8, calling apparatus 2 can receive a response signal at timing M. In FIG. 8, h is about 10 ms. In addition, in the case illustrated in FIG. 8, control section 28 performs control such that the transmission of a calling signal and the reception of a response signal are repeatedly performed, for example, at an interval of h (10 ms) after time point M.

However, as illustrated in FIG. 8, the transmission timing of a calling signal and the reception timing of a response signal are different from each other. Meanwhile control section 38 of locator 3 performs control such that the reception of a calling signal and the transmission of a response signal are repeatedly performed at an interval of 10 ms in synchronization with calling apparatus 2. However, as illustrated in FIG. 8, the reception timing of a calling signal and the transmission timing of a response signal are different from each other.

As described above, timing information (in other words, information of transmission slot g) is transmitted on calling signals j that are consecutively transmitted in period k by calling apparatus 2 using 23 transmission slots. The timing information described here is information that indicates the transmission timing used for returning a response signal to calling apparatus 2 by locator 3 that has received with calling signal j. In addition, timing information for transmitting a control signal that is regularly transmitted by calling apparatus 2 thereafter is transmitted on calling signal j. The timing information described here is information of slot g that is used by locator 3 for receiving a control signal.

Then, locator 3 that has received the calling signal determines the next reception timing based on the information of slot f transmitted with the calling signal. In addition, locator 3 determines transmission timing at which a response signal is transmitted to calling apparatus 2 using slot g based on the information of slot g transmitted with the calling signal. Accordingly, after time point M illustrated in FIG. 8, calling apparatus 2 transmits a control signal at an interval of h (about 10 ms) using slot f, and locator 3 receives the control signal in slot f. In addition, locator 3 transmits a response signal to calling apparatus 2 using slot g, and calling apparatus 2 receives the response signal from locator 3 in slot g.

As described above, in the configuration according to the related art illustrated in FIG. 7, calling apparatus 2 does not perform reception standby for a response signal during certain time period e when the calling signals are consecutively transmitted. Accordingly, there is concern that useless transmission of a calling signal may be continued in calling apparatus 2. On the other hand, according to the embodiment of the present invention illustrated in FIG. 8 or 9, when calling signals are consecutively transmitted, calling apparatus 2, during certain time period e, regularly stands by for the reception of a response signal from locator 3 and stops the consecutive transmission of calling signals by being triggered upon the reception of a response signal. Accordingly, calling apparatus 2 can stop useless transmission of a calling signal and thus can receive a response signal from locator 3 more quickly. As a result, disadvantage of delaying the reception of a response signal from locator 3 by calling apparatus 2 and interrupting communication of other apparatuses can be avoided.

An example of the operation performed when calling apparatus 2 calls locator 3 in the locator system according to this embodiment has been described thus far.

As described above, according to the locator system of this embodiment, the calling apparatus regularly stands by for the reception of a response signal when calling signals are consecutively transmitted and stops the consecutive transmission of calling signals by being triggered upon the reception of the response signal from the locator. Accordingly, the calling apparatus can stop useless transmission of a calling signal. As a result, disadvantage of delaying the reception of a response signal from the locator by the calling apparatus and interrupting communication of other apparatuses can be avoided.

Although the embodiment has been described thus far, the description presented above is only an example, and various modifications are possible.

For example, in the above-described embodiment, although the description has been provided using an example in which the present invention is configured by hardware, the present invention may be realized by software in concert with hardware.

In addition, in the description presented above with reference to FIG. 8, for example, the example of the timing when calling apparatus 2 calls locator 3 may be either a timing when calling apparatus 2 outputs a notification sound to locator 3 or a timing when calling apparatus 2 registers locator 3.

INDUSTRIAL APPLICABILITY

A radio communication apparatus and a radio communication system according to the present invention are useful for an apparatus, a system, a method, a program, and the like searching for an item using near field radio communication.

REFERENCE SIGNS LIST

1 Base unit
2, 4 Calling apparatus
3, 5 Locator
11, 21, 31 Power supply section
12, 22 Clock generating section
13 Line control section
14, 53 Operation section
15, 25 Display section
16, 26, 36 Frame processing section
17, 27, 37 Radio communication section
18, 28, 38 Control section
19, 29, 39 ROM
23, 33, 44 Timer section
24 Phone call section
30, 40, 60 RAM
32 First clock generating section
34 Switch
35 Communication block
41, 51, 61 EEPROM
42, 52, 62 Notification section
43 Second clock generating section
54, 64 Registration information storing section
170, 270, 370 Synchronization control section
380 Notification control section
410 ID storing section

The invention claimed is:

1. A radio communication apparatus comprising:
a transmitter which, in operation, transmits, using a near field radio communication protocol, a calling signal to a locator attachable to an item, wherein the locator periodically wakes up to enter into a monitor period having a first period length, during which the locator performs reception monitor operation of the calling signal; and
a controller which, in operation, enters into a calling period having a second period length, during which the transmitter successively transmits a plurality of calling signals, the second period length being greater than the first period length, and when a response signal is received from the locator stops the successive transmission of the plurality of calling signals even prior to expiration of the calling period, wherein the calling period includes multiple frames of a fixed length and each frame includes a transmission period, in which the calling signal is transmitted, and a standby period, which is shorter than the transmission period and in which the controller monitors for the response signal from the locator.

2. The radio communication apparatus according to claim 1, wherein:
the near field radio communication protocol is a communication protocol that is compliant with a time division multiple access (TDMA)/time division duplex (TDD) standard in which one frame is divided into N slots; and
per frame, the transmission period includes (N−1) slots and the standby period includes 1 slot.

3. The radio communication apparatus according to claim 1, wherein:
the near field radio communication protocol is a communication protocol that is compliant with a time division multiple access (TDMA)/time division duplex (TDD) standard in which one frame is divided into 24 slots; and
per frame, the transmission period includes 23 slots and the standby period includes 1 slot.

4. The radio communication apparatus according to claim 1, wherein the controller, after stopping the successive transmission of the plurality of calling signals, causes transmission of the calling signal using one slot in a first period and stands by to receive the response signal using one slot in a second period, wherein reception timing of the response signal in the second period is shifted from transmission timing of the calling signal in the first period.

5. A radio communication system comprising:
a locator that is attachable to an item and that, in operation, periodically wakes up to enter into a monitor period having a first period length, during which the locator performs reception monitor operation of a calling signal; and
a calling apparatus including:
a transmitter which, in operation, transmits, using a near field radio communication protocol, the calling signal to the locator; and
a controller which, in operation, enters into a calling period having a second period length, during which the transmitter successively transmits a plurality of calling signals, the second period length being greater than the first period length, and when a response signal is received from the locator stops the successive transmission of the plurality of calling signals even prior to expiration of the calling period, wherein the calling period includes multiple frames of a fixed length and each frame includes a transmission period, in which the calling signal is transmitted, and a standby period, which is shorter than the transmission period and in which the controller monitors for the response signal from the locator.

6. The radio communication system according to claim 5, wherein:
the near field radio communication protocol is a communication protocol that is compliant with a time division multiple access (TDMA)/time division duplex (TDD) standard in which one frame is divided into N slots; and
per frame, the transmission period includes (N−1) slots and the standby period includes 1 slot.

7. The radio communication system according to claim 5, wherein:
the near field radio communication protocol is a communication protocol that is compliant with a time division multiple access (TDMA)/time division duplex (TDD) standard in which one frame is divided into 24 slots; and
per frame, the transmission period includes 23 slots and the standby period includes 1 slot.

8. The radio communication system according to claim 5, wherein the controller of the calling apparatus, after stopping the successive transmission of the plurality of calling signals, causes transmission of the calling signal using one slot in a first period and stands by to receive the response signal using one slot in a second period, wherein reception timing of the response signal in the second period is shifted from transmission timing of the calling signal in the first period.

9. A calling method for transmitting a calling signal to a locator attachable to an item, using a near field radio communication protocol, the locator being configured to periodically wake up to enter into a monitor period having a first period length during which the locator performs reception monitor operation of the calling signal, the calling method comprising:
entering into a calling period during which a plurality of calling signals are successively transmitted, the calling period having a second period length that is greater than the first period length, wherein the calling period includes multiple frames of a fixed length and each frame includes a transmission period and a standby period that is shorter than the transmission period;
in the calling period, repeating i) transmitting the calling signal in the transmission period in one frame, and ii) standing by to receive a response signal from the locator in the standby period in said one frame; and
when the response signal is received from the locator stopping the successive transmission of the plurality of calling signals even prior to expiration of the calling period.

10. The calling method according to claim 9, further comprising:
after stopping the successive transmission of the plurality of calling signals, transmitting the calling signal using one slot in a first period; and standing by to receive the response signal using one slot in a second period, wherein reception timing of the response signal in the second period is shifted from transmission timing of the calling signal in the first period.

11. The calling method according to claim 9, wherein:
the near field radio communication protocol is a communication protocol that is compliant with a time division multiple access (TDMA)/time division duplex (TDD) standard in which one frame is divided into N slots; and
per frame, the transmission period includes (N−1) slots and the standby period includes 1 slot.

12. The calling method according to claim 9, wherein:
the near field radio communication protocol is a communication protocol that is compliant with a time division multiple access (TDMA)/time division duplex (TDD) standard in which one frame is divided into 24 slots; and
per frame, the transmission period includes 23 slots and the standby period includes 1 slot.

* * * * *